US011683106B2

(12) United States Patent
Narra et al.

(10) Patent No.: US 11,683,106 B2
(45) Date of Patent: Jun. 20, 2023

(54) DYNAMIC ANTENNA SELECTION AND BEAM STEERING

(71) Applicant: Apple Inc., Cupertino, CA (US)

(72) Inventors: Shiva Krishna Narra, San Jose, CA (US); Madhukar K. Shanbhag, Santa Clara, CA (US); Pengkai Zhao, Cupertino, CA (US); Sami M. Almalfouh, San Jose, CA (US); Sanjeevi Balasubramanian, San Jose, CA (US); Sriram Subramanian, Santa Clara, CA (US); Wei Zhang, Santa Clara, CA (US); Yi Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/813,264

(22) Filed: Mar. 9, 2020

(65) Prior Publication Data

US 2020/0295854 A1 Sep. 17, 2020

Related U.S. Application Data

(60) Provisional application No. 62/817,960, filed on Mar. 13, 2019.

(51) Int. Cl.
*H04B 17/21* (2015.01)
*H04W 16/28* (2009.01)
(Continued)

(52) U.S. Cl.
CPC ............ *H04B 17/21* (2015.01); *H01Q 1/243* (2013.01); *H01Q 3/247* (2013.01); *H01Q 21/28* (2013.01);
(Continued)

(58) Field of Classification Search
CPC .... H04B 17/21; H04B 7/0888; H04B 17/327; H04B 7/0808; H04B 7/0814;
(Continued)

(56) References Cited

U.S. PATENT DOCUMENTS 8,818,354 B1 * 8/2014 Bennett ................ H04L 41/145
455/423
10,587,043 B2 * 3/2020 Hwang ................. H04B 17/00
(Continued)

FOREIGN PATENT DOCUMENTS

CN 1979946 6/2007
CN 104321984 1/2015
(Continued)

OTHER PUBLICATIONS

Dong, K.; Wang, X.; Zhu, S. Adaptive backup antenna selection to mitigate blockage effect in 60GHz system. 2011, IEEE Computer Society. 3rd IEEE International Conference on Broadband Network and Multimedia Technology, IC-BNMT2010, pp. 316-321; http://dx.doi.org/10.1109/ICBNMT.2010.5705102. (Year: 2011).*
(Continued)

*Primary Examiner* — Lana N Le
(74) *Attorney, Agent, or Firm* — Fay Kaplun & Marcin, LLP

(57) ABSTRACT

A method performed by a user equipment (UE) configured with a plurality of antenna panels. Each antenna panel is configured to beamform over a millimeter wave (mmWave) frequency band. The method includes identifying a predetermined condition corresponding to a first antenna panel of the plurality of antenna panels, selecting a second antenna panel of the plurality of antenna panels based on identifying the predetermined condition corresponding to the first antenna panel and transmitting a beam via the second antenna panel based on the selection.

20 Claims, 10 Drawing Sheets

(51) Int. Cl.
*H04W 52/24* (2009.01)
*H01Q 3/24* (2006.01)
*H01Q 1/24* (2006.01)
*H04B 7/08* (2006.01)
*H04B 17/327* (2015.01)
*H01Q 21/28* (2006.01)

(52) U.S. Cl.
CPC ......... *H04B 7/0808* (2013.01); *H04B 7/0814* (2013.01); *H04B 7/0888* (2013.01); *H04B 17/327* (2015.01); *H04W 16/28* (2013.01); *H04W 52/241* (2013.01)

(58) Field of Classification Search
CPC .. H04B 17/345; H04B 7/0691; H04B 7/0695; H04B 7/0608; H04B 7/0617; H04B 7/0802; H04W 16/28; H04W 52/241; H04W 28/0236; H04W 52/243; H04W 40/16; H04W 40/12; H01Q 3/247; H01Q 1/243; H01Q 21/28
See application file for complete search history.

(56) References Cited

U.S. PATENT DOCUMENTS

| | | | |
|---|---|---|---|
| 11,047,893 B2 * | 6/2021 | Choi | G06F 1/163 |
| 2006/0139833 A1 | 6/2006 | Ranta et al. | |
| 2010/0013718 A1 * | 1/2010 | Zhu | H01Q 9/0421 |
| | | | 343/702 |
| 2011/0250928 A1 * | 10/2011 | Schlub | H01Q 1/243 |
| | | | 455/550.1 |
| 2011/0287820 A1 * | 11/2011 | Harrison | H01Q 21/28 |
| | | | 455/575.7 |
| 2014/0011504 A1 | 1/2014 | Gale et al. | |
| 2015/0055789 A1 * | 2/2015 | Bernal Castillo | G10K 11/1785 |
| | | | 381/71.6 |
| 2015/0200701 A1 | 7/2015 | Stave | |
| 2017/0331522 A1 * | 11/2017 | Tangen | H04B 5/0031 |
| 2018/0026379 A1 * | 1/2018 | Barker | H01Q 21/24 |
| | | | 343/844 |
| 2018/0199212 A1 | 6/2018 | Lin et al. | |
| 2019/0037574 A1 * | 1/2019 | Lee | H04B 7/0691 |
| 2019/0123797 A1 * | 4/2019 | Armand | H01Q 3/2647 |
| 2019/0254085 A1 * | 8/2019 | Venkataraman | H04W 76/14 |
| 2019/0320408 A1 * | 10/2019 | Opshaug | H04W 64/00 |
| 2020/0028742 A1 * | 1/2020 | Ren | H04W 24/10 |
| 2020/0037297 A1 * | 1/2020 | Pan | H04W 72/044 |
| 2020/0186231 A1 * | 6/2020 | Cao | H04W 72/042 |
| 2020/0235800 A1 * | 7/2020 | Tang | H04B 7/0408 |
| 2021/0075526 A1 * | 3/2021 | Pefkianakis | H04L 1/0026 |

FOREIGN PATENT DOCUMENTS

| | | | | |
|---|---|---|---|---|
| CN | 104380617 | | 2/2015 | |
| CN | 104981987 | | 10/2015 | |
| CN | 105826654 | | 8/2016 | |
| CN | 106464320 | | 2/2017 | |
| CN | 107425888 | | 12/2017 | |
| CN | 108900231 | | 11/2018 | |
| CN | 109155659 | | 1/2019 | |
| CN | 109314548 | | 2/2019 | |
| CN | 109391296 | | 2/2019 | |
| DE | 102010019837 | | 11/2011 | |
| JP | S5611239 | | 2/1981 | |
| JP | 2000/307494 | | 11/2000 | |
| JP | 2006/133108 | | 5/2006 | |
| WO | 2018/001310 | | 1/2018 | |
| WO | 2018/001362 | | 1/2018 | |
| WO | WO-2018004918 A1 * | 1/2018 | ............... H04B 7/04 |
| WO | WO-2018177224 | * | 10/2018 | .......... H04W 72/044 |
| WO | WO-2018177224 A1 * | 10/2018 | .......... H04W 72/044 |
| WO | WO-2020153888 A1 * | 7/2020 | ........... H04B 7/0465 |

OTHER PUBLICATIONS

Andrews et al, "Modeling and Analyzing Millimeter Wave Cellular Systems", (2016), IEEE Transactions on Communications, 0090-6778, 10.1109/TCOMM.2016.2618794, pp. 1-29. (Year: 2016).*

Onol et al., "Antenna Switch Optimizations Using Genetic Algorithms Accelerated with the Multilevel Fast Multipole Algorithm", IEE International Symposium on Antennas and Propagation and USNC/URSI National Radio Science Meeting, Oct. 26, 2015, 2 sheets.

Peng Li, "Enhancing Airborne Ultrashort Wave Backward Communication Capability Using Antenna Switching Technology" China New Communication, Nov. 20, 2018, 3 sheets.

* cited by examiner

DYNAMIC ANTENNA SELECTION AND BEAM STEERING

PRIORITY INFORMATION/INCORPORATION BY REFERENCE

This application claims priority to U.S. Provisional Application 62/817,960 entitled "Dynamic Antenna Selection and Beam Steering," filed on Mar. 13, 2019, the entirety of which is incorporated herein by reference.

BACKGROUND

A user equipment (UE) may establish a connection to at least one of a plurality of different networks or types of networks. The UE may access services available via the network connection by communicating with a base station of the corresponding network. In some networks, the UE may propagate a signal from an antenna module over a high frequency band by beamforming. Transmitting a beam over a high frequency band may provide an increase in bandwidth and an increase in the data rate compared to legacy approaches. However, a beam may experience signal losses when the path between the transmission point and the reception point is obstructed by a physical object or due to interference caused by connected accessories.

Under conventional circumstance, the UE does not consider these possible impairments when selecting an antenna module or beam path to utilize for an uplink transmission. For example, the UE may select an antenna module that has a line of sight to the base station that is entirely obstructed by the user's hand. The obstruction may cause the beam to experience attenuation that prevents the beam from delivering the information and/or data to the base station. Similarly, the UE may select an antenna module adjacent to a charging port with a currently connected charging cable. The interference generated by the charging cable connection may also cause the beam to experience attenuation.

When the UE is unable to successfully deliver a beam to the base station, the UE may experience latency with respect to subsequent operations and downlink/uplink communications. Further, this may also cause the number of operations performed by the UE to increase which necessarily causes an increase in power consumption.

SUMMARY

In some exemplary embodiments, a method is performed by a user equipment (UE) configured with a plurality of antenna panels. Each of the antenna panels is configured to beamform over a millimeter wave (mmWave) frequency band. The method includes identifying a predetermined condition corresponding to a first antenna panel of the plurality of antenna panels, selecting a second antenna panel of the plurality of antenna panels based on identifying the predetermined condition corresponding to the first antenna panel and transmitting a beam via the second antenna panel based on the selection.

In other exemplary embodiments, a method is performed by a user equipment (UE) configured with a plurality of antenna panels. The method includes determining a predetermined condition based on a received signal, detecting, for each antenna panel, whether there is an obstruction between the antenna panel and an intended reception point for a signal to be transmitted by the UE and selecting one of the antenna panels to transmit the signal based on at least the detecting whether there is the obstruction.

In still other exemplary embodiments, a user equipment having a plurality of antenna panels, a sensor and a processor is described. The sensor is configured to detect, for each antenna panel, whether there is an obstruction between the antenna panel and an intended reception point for a signal to be transmitted by the UE. The processor is configured to select one of the antenna panels to transmit the signal based on at least the whether the sensor detected a corresponding obstruction for each of the antenna panels.

DETAILED DESCRIPTION

Figure 1A:
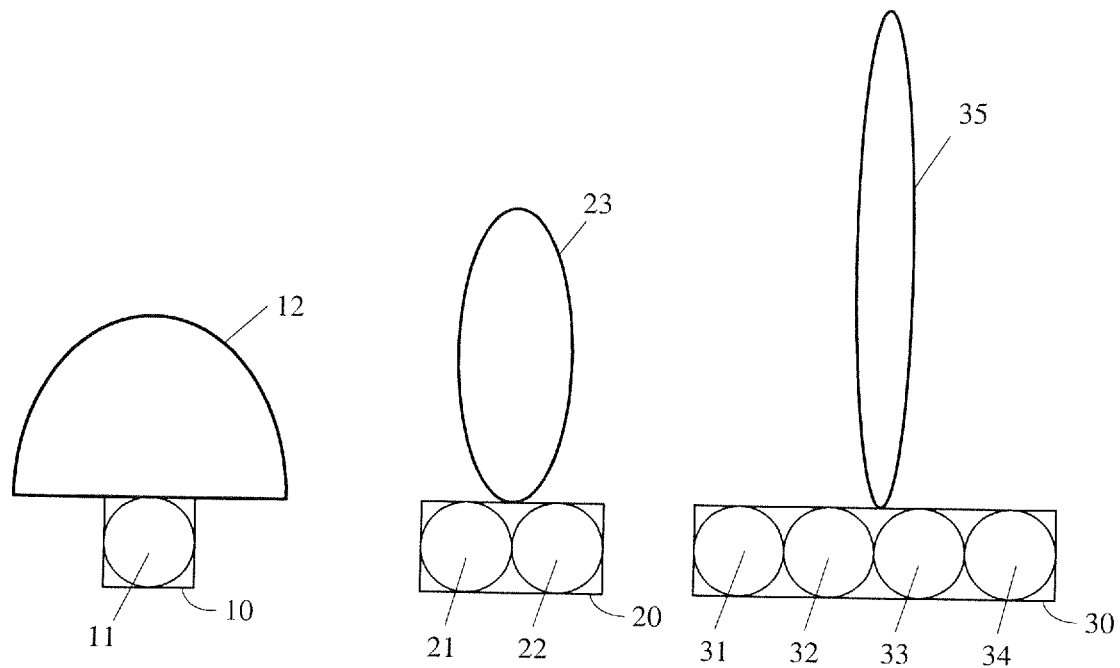
FIG. 1A shows an example of three antenna modules and their corresponding radiation patterns.

The exemplary embodiments may be further understood with reference to the following description and the related appended drawings, wherein like elements are provided with the same reference numerals. The exemplary embodiments describe a device, system and method for a user equipment (UE) to improve beam management by incorporating object detection and accessory detection. For example, the UE may identify an obstruction in the line of sight between an antenna module of the UE and a base station of the corresponding network. The UE may also identify the presence of a connected accessory that may cause interference on a beam transmitted by a particular antenna module. During beam management, the UE may avoid selecting a particular antenna module and/or particular beam configuration based on the presence of these factors.

The exemplary embodiments are described with regard to a UE. However, the use of a UE is merely for illustrative purposes. The exemplary embodiments may be utilized with any electronic component that may establish a connection with a network and configured with the hardware, software, and/or firmware to exchange information and data with the network. Therefore, the UE as described herein is used to represent any electronic component.

Further, the exemplary embodiments are described with regard to the cellular network being a 5G New Radio (NR) network with millimeter wave (mmWave) functionality. A person of ordinary skill in the art would understand that mmWave functionality relates to utilizing a frequency band between 10 GHz and 300 GHz for wireless communications. Radio frequency waves propagated over these high frequency bands have wavelengths of 1-10 millimeters. The UE may communicate with the 5G NR network by participating in a signaling exchange with a base station. This signaling exchange may occur, at least in part, over mmWave frequency bands. In one example, the base station may be a next generation Node B (gNB). However, reference to a particular network or a particular type of base station is merely provided for illustrative purposes. Those skilled in the art will understand that the exemplary embodiments may apply to any type of network and any type of base station within the corresponding network that supports at least uplink communication over mmWave frequency bands.

The exemplary embodiments are also described with regard to beamforming which is an antenna technique that that is utilized to propagate a directional signal over a mmWave frequency band. Throughout this description, the term "beam" may refer to a beamformed signal. However, reference to a beam is merely exemplary. Different networks may refer to a signal propagated over mmWave frequencies by a different name.

To generate a beam, a plurality of antenna elements may be configured to radiate the same signal. Increasing the number of antenna elements radiating the signal decreases the width of the radiation pattern and increases the gain. FIG. 1A shows an example of three antenna modules 10, 20, 30 and exemplary radiation patterns 12, 23, 35, respectively. Antenna module 10 includes a single antenna element 11 and generates the radiation pattern 12. Antenna module 20 includes two antenna elements 21, 22 and generates the radiation pattern 23. Antenna module 30 includes four antenna elements 41-44 and generates the radiation pattern 35. A comparison of the radiation patterns 12, 23, 35 illustrates the effects the number of antenna elements has on the geometry of the radiation pattern. For instance, in this example, the radiation pattern 12 is the widest radiation pattern because the antenna module 10 has the fewest number of antenna elements (e.g., one). The antenna module 20 has two antenna elements 21, 22. The additional antenna element allows antenna module 20 to generate a radiation pattern 23 that is narrower than the radiation pattern 12. The antenna module 30 has four antenna elements 41-44. Thus, compared to antenna modules 10, 20, antenna module 30 has the most antenna elements. As a result, the antenna module 30 may generate a radiation pattern 35 that is narrower than the radiation patterns 12, 23 and provides the most gain.

To establish and/or maintain a communication link with the base station, the UE may have to transmit a beam in any of a plurality of different directions. The direction in which a beam is propagated may be based on the phase and/or magnitude of the signal provided to each antenna element of the antenna module. Thus, the antenna module may cover a spatial area with a plurality of beams each propagated in a different direction by appropriately weighting the phase and/or magnitude of the signal provided to each antenna element for each beam.

Figure 1B:
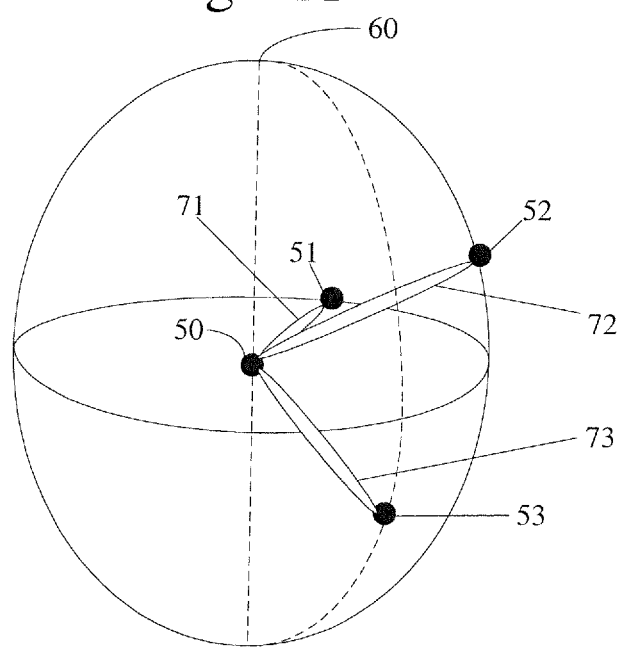
FIG. 1B shows an example of the directions in which an antenna module may propagate a beam.

FIG. 1B shows an example of the directions in which an antenna module 50 may propagate a beam. The antenna module 50 is located at the center of the spherical coordinate system 60 and represents a transmission point. Points 51, 52, 53 on the spherical coordinate system 60 each represent a different reception point. At a first time, the antenna elements of the antenna module 50 are provided with a first input signal to propagate a beam 71 in the direction of reception point 51. The direction of the beam 71 is generated based on the phase and/or magnitude of the signal provided to each antenna element of the antenna module 50. At a second time, the antenna elements of the antenna module 50 are provided with a second input signal to propagate the beam 72 in the direction of the reception point 52. Similarly, the direction of the beam 72 is generated based on the phase and/or magnitude of the signal provided to each antenna element of the antenna module 50. At a third time, the antenna elements of the antenna module 50 are provided with a third input signal to propagate the beam 73 in the direction of the reception point 53. Again, the direction of the beam 73 is generated based on the phase and/or magnitude of the signal provided to each antenna element of the antenna module 50. Thus, the antenna module 50 may deliver the beams 71, 72, 73 to receptions points 51, 52, 53 from the same transmission point despite the reception points 51, 52, 53 each being located in different horizontal and vertical directions relative to the antenna element 50. The above example is merely provided for illustrative purposes. The exemplary embodiments may propagate a beam in any direction and control the direction of the beam in any appropriate manner.

The exemplary embodiments may also be described with regard to beam management. Throughout this description beam management may generally refer to any of a wide variety of operations related to the UE establishing, maintaining and/or utilizing a communication link with a base station or any other device with which the UE may communicate (e.g., another UE via sidelink communications). The exemplary embodiments relate to scenarios where the UE selects an antenna module and/or a direction in which to propagate a beam. In the context of beam management, these selections may occur for the transmission of control information and/or data related to operations such as, but not limited to, establishing uplink synchronization, maintaining uplink synchronization, delivering payload data, handover, beam path selection, radio link recovery, scheduling requests, etc. However, these examples are merely provided for illustrative purposes, the exemplary embodiments may apply to any scenario in which the UE is to select an antenna module and/or direction in which to propagate a beam.

Beamforming over mmWave frequencies may increase the bandwidth and the data rate available to the UE. However, these beams may be attenuated and unable to penetrate physical objects obstructing their path. Accordingly, ideal conditions for a beam may include a clear line of sight from the transmission point to the reception point and a beam path that is free from interference.

Conventionally, when selecting an antenna module and/or a propagation path for a beam, the UE may not account for the presence of objects obstructing the line of sight between one of the UE's antenna modules and one of the base stations of the network. For example, an object such as a wall, a table or a body part of the user may be obstructing the line of sight between an antenna module of the UE and the base station. The obstruction may cause the beam to experience attenuation and be unable to successfully deliver information and/or data to the base station. Similarly, the UE may not take into account the presence of a connected accessory. For example, a connected charging cable may generate electrical interference which may cause the beam to experience attenuation and be unable to successfully deliver its information and/or data to the base station.

Thus, under conventional circumstances, the UE may initiate the transmission of a beam from a particular antenna module in a particular direction despite the beam being unlikely to successfully reach the intended reception point. This may cause the UE to attempt to send a further beam and/or wait for a non-existent response from the base station. As a result, the UE experiences latency and an increase in power consumption.

The exemplary embodiments relate to incorporating object detection and accessory detection into beam management to avoid transmitting beams that are unlikely to successfully reach their intended reception point. For example, the UE may be configured to determine whether there are any objects in the line of sight between an antenna module and the reception point. Further, the UE may also be configured to determine whether there are any connected accessories. During beam management, the UE may avoid selecting a particular antenna module and/or a particular propagation path based on these factors.

Figure 2:
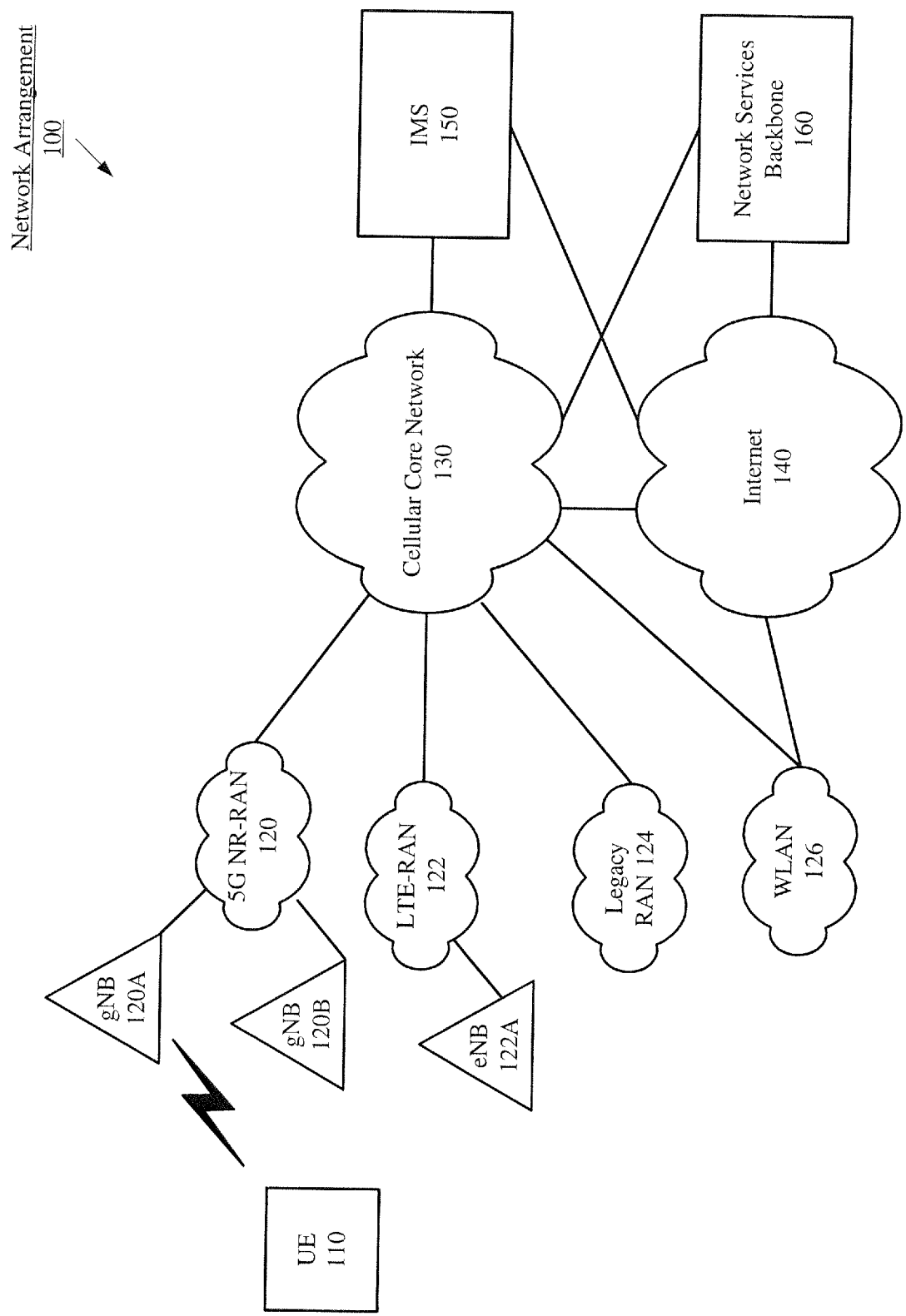
FIG. 2 shows an exemplary network arrangement according to various exemplary embodiments.

FIG. 2 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, a LTE radio access network (LTE-RAN) 122, a legacy radio access network (RAN) 124 and a wireless local access network (WLAN) 126. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122, a legacy chipset to communicate with the legacy RAN 124 and a WLAN chipset to communicate with the WLAN 126.

The 5G NR-RAN 120, The LTE-RAN 122 and the legacy RAN 124 may be portions of cellular networks that may be deployed by cellular providers (e.g., Verizon, AT&T, Sprint, T-Mobile, etc.). These networks 120, 122, 124 may include, for example, cells or base stations (Node Bs, eNodeBs, HeNBs, eNBS, gNBs, gNodeBs, macrocells, macrocells, small cells, femtocells, etc.) that are configured to send and receive traffic from UEs that are equipped with the appropriate cellular chip set. The WLAN 126 may include any type of wireless local area network (WiFi, Hot Spot, IEEE 802.11x networks, etc.).

The UE 110 may connect to the 5G NR-RAN via the gNB 120A. As mentioned above, the exemplary embodiments are related to mmWave functionality. Accordingly, the gNB 120A may be configured with the necessary hardware (e.g., antenna array), software and/or firmware to perform massive multiple in multiple out (MIMO) functionality. Massive MIND may refer to a base station that is configured to transmit and receive a plurality of beams with a plurality of UEs. During operation, the UE 110 may be within range of a plurality of gNBs. Thus, either simultaneously or alternatively, the UE 110 may also connect to the 5G NR-RAN via the gNB 120B. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122, 124 and 126 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 3:
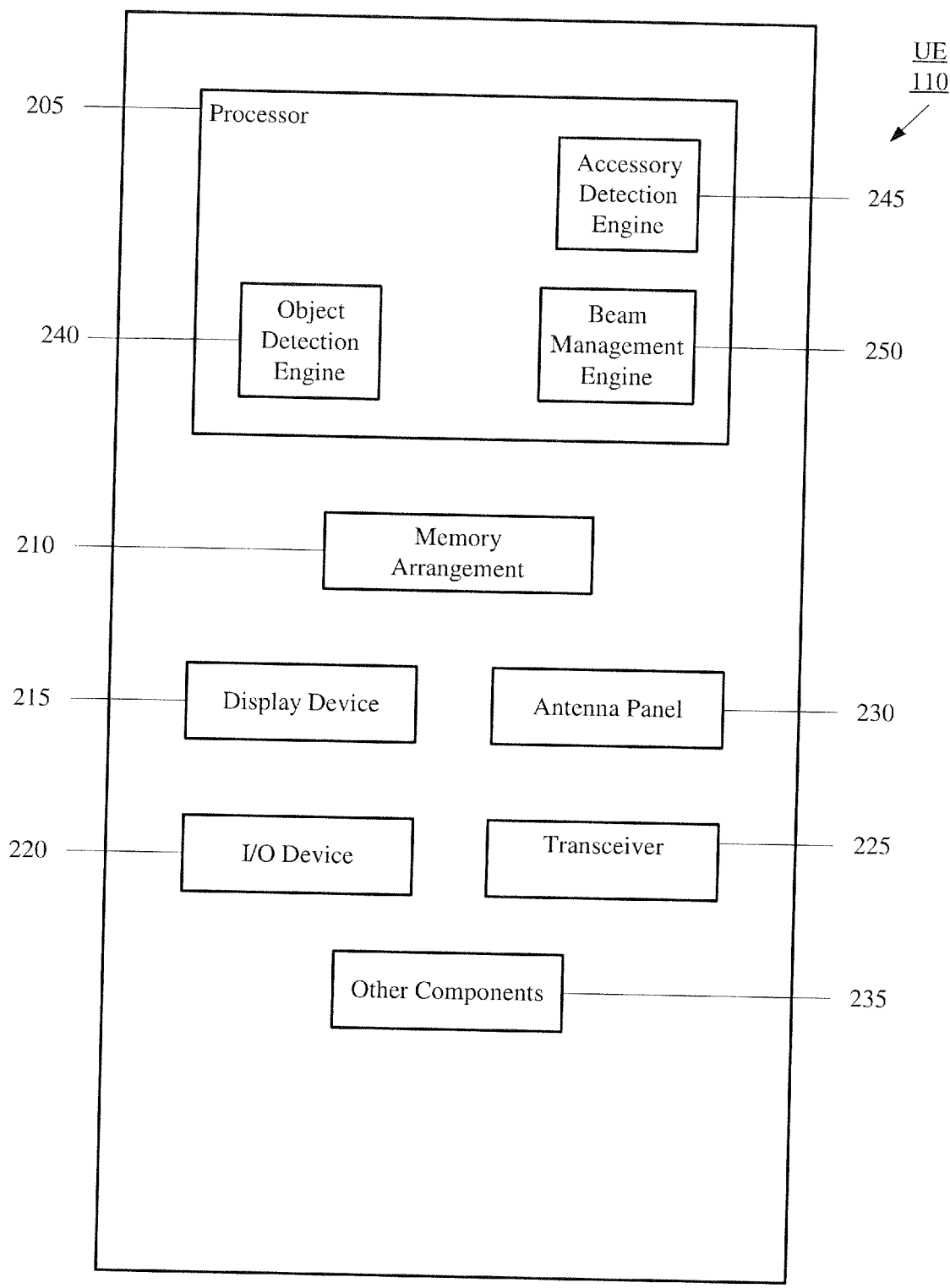
FIG. 3 shows an exemplary UE according to various exemplary embodiments.

FIG. 3 shows an exemplary UE 110 according to various exemplary embodiments. The UE 110 will be described with regard to the network arrangement 100 of FIG. 2. The UP 110 may represent any electronic device and may include a processor 205, a memory arrangement 210, a display device 215, an input/output (I/O) device 220, a transceiver 225, an antenna panel 230 and other components 235. The other components 235 may include, for example, an audio input device, an audio output device, a battery that provides a limited power supply, a data acquisition device, ports to electrically connect the UE 110 to other electronic devices, a front Facing camera, a rear facing camera, sensors to detect conditions of the UE 110, etc.

The antenna panel 230 may be an antenna module that includes a plurality of antenna elements and is configured to perform beamforming. Throughout this description an antenna panel may refer to an antenna module that is configured to perform beamforming. The antenna panel may be referenced or depicted as being comprised of four antenna elements. However, any reference or depiction of a particular number of antenna panels or a particular number of antenna elements is merely provided for illustrative purposes. The UE 110 may include any appropriate number of antenna panels and each antenna panel may include any appropriate number of antenna elements. An exemplary antenna panel configuration will be discussed in more detail below with regard to FIG. 4.

Returning to FIG. 3, the processor 205 may be configured to execute a plurality of engines of the UE 110. For example, the engines may include an object detection engine 240, an accessory detection engine 245 and a beam management engine 250. The object detection engine 240 may collect data from various other components of the UE 110 to determine whether there are any physical objects within the vicinity of the antenna panel 230. The accessory detection engine 245 may identify whether an accessory is connected to the UE 110. The beam management engine 250 may perform various operations related to beam management. This may include selecting the antenna panel 230 and a propagation path for a beam based on information received from the object detection engine 240 and the accessory detection engine 245.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the legacy RAN 124, the WLAN 126, etc. Accordingly, the transceiver 225 may operate on a variety of different frequencies or channels (e.g., set of consecutive frequencies).

Figure 4:
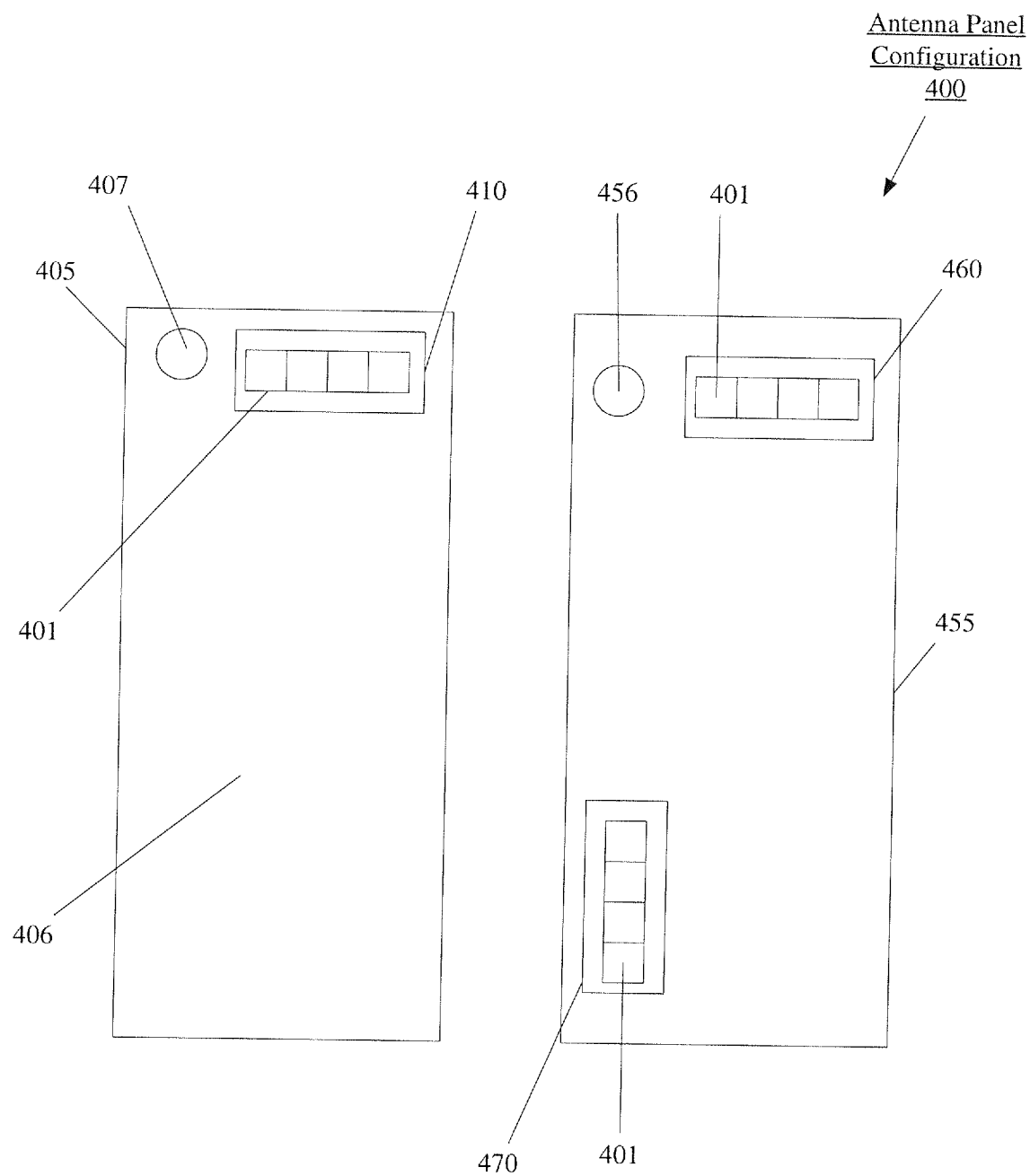
FIG. 4 shows an exemplary antenna panel configuration for the UE according to various exemplary embodiments.

FIG. 4 shows an exemplary antenna panel configuration 400 for the UE 110 according to various exemplary embodiments. The exemplary antenna panel configuration 400 will be described with regard to the UT 110 of the FIG. 3.

The front 405 of the UE 110 may include the display 406, a front facing camera 407 and a first antenna panel 410. The back 455 of the UE 110 may include a rear facing camera 456, a second antenna panel 460 and a third antenna panel 470. Each antenna panel 410, 460, 470 is shown to include four antenna elements 401. The exemplary embodiments are not limited to exemplary antenna panel configuration 400. The UE 110 may also be configured with an antenna panel facing the left, right, top or bottom sides of the UE 110. Accordingly, the exemplary embodiments may apply to a UE 110 that includes any number of antenna panels in any orientation. It should also be understood that the antenna panels may be located beneath other components or within the interior of the UE 110 and may not be visible when looking at the UE 110.

The UE 110 may be configured to be in one of a plurality of different operating states when the UE 110 is camped on a cell of a network. One operating state may be characterized as RRC idle state, another operating state may be characterized as RRC inactive state and another operating state may be characterized as RAC connected state. RRC refers to the radio resource control (RRC) protocols. Those skilled in the art will understand that when the UE 110 is in RRC connected state, the UE 110 and the 5G NR-RAN 120 may be configured to exchange information and/or data. The exchange of information and/or data may allow the UE 110 to perform functionalities available via the network connection. Further, those skilled in the art will understand that when the UE 110 is connected to the 5G NR-RAN 120 and in RRC idle state the UE 110 is generally not exchanging data with the network and radio resources are not being assigned to the UE 110 within the network. In RRC inactive state, the UE 110 maintains an RRC connection while minimizing signaling and power consumption. However, when the UE 110 is in RRC idle state or RRC inactive state, the UE 110 may monitor for information and/or data transmitted by the network. Throughout this description these terms are being used generally to describe states the UE 110 may be in when connected to any network and that exhibit the characteristics described above for the RRC idle, RRC connected and RRC inactive states.

The UE 110 may be configured to initiate beam management in any RRC operating state. As mentioned above, beam management may generally refer to any of a wide variety of operations related to the UE 110 establishing, maintaining and/or utilizing a communication link with a base station. For example, when the UE 110 is camped on a base station of the corresponding network in an RRC idle state or in an RRC inactive state, the UE 110 may not be currently configured to transmit data to the network. To synchronize beamformed communications in the uplink direction, the UE 110 may transition to RRC connected state. This may include beam sweeping by the UE 110 during an initial access procedure. Beam sweeping refers to transmitting a plurality of beams over a particular spatial area during a predetermined duration. Each beam transmitted during beam sweeping may include at least one sounding reference signal (SRS). The base station may measure the quality of each beam based on the SRSs and may determine which beam the UE 110 is to utilize for subsequent communications. Reference to SRS is merely exemplary and different beam management operations may utilize different types of control information.

When the UE 110 is in the RRC connected state, the network may schedule instances in which the UE 110 is to perform beam sweeping. This may enable the network to monitor whether the configuration of the uplink communication link is to be modified. Beam management is not limited to scenarios in which beam sweeping is performed. The exemplary embodiments may apply to other scenarios such as but not limited to, beam failure recovery procedures, transmitting payload data, transmitting a scheduling request, handover, cell selection, cell reselection, random access procedures, etc. Reference to beam management is merely for illustrative purposes, the exemplary embodiments may apply to any operation that requires the UE 110 to select an antenna module and/or direction in which to propagate a beam.

Figure 5:
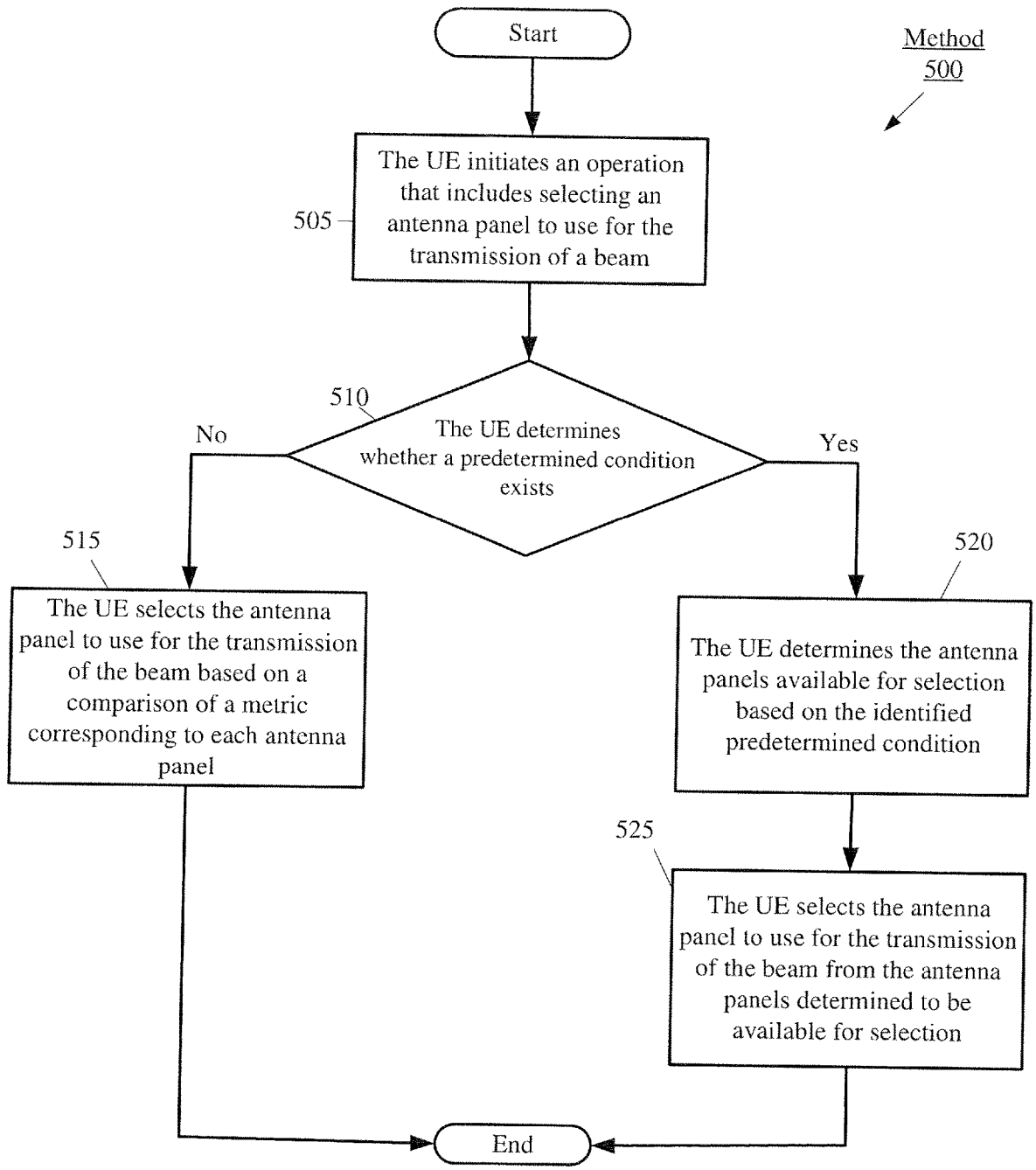
FIG. 5 shows a method for the UE to perform beam management with object detection and accessory detection according to various exemplary embodiments.

FIG. 5 shows a method 500 for the UE 110 to perform beam management with object detection and accessory detection according to various exemplary embodiments. The method 500 will be described with regard to the network arrangement 100 of FIG. 2, the UE 110 of FIG. 3 and the exemplary antenna panel configuration 400 of FIG. 4.

As mentioned above, under conventional circumstances, when the UE 110 is triggered to select a particular antenna panel, the UE 110 may select an antenna panel that is unlikely to successfully deliver a beam to its intended reception point. In one example, there may be a physical object obstructing the line of sight between the selected antenna panel and the reception point. The obstruction may cause the beam to experience attenuation and be unable to successfully deliver its contents to the base station. In another example, a connected accessory may generate interference. Similarly, the interference may cause the beam to experience attenuation and be unable to successfully deliver its contents to the base station. The method 500 relates to a mechanism that enables the UE 110 to avoid selecting an antenna panel that is unlikely to successfully deliver a beam to its intended reception point based on identifying these types of factors.

In 505, the UE 110 initiates an operation that includes selecting an antenna panel to use for the transmission of a beam. When the UE 110 is equipped with the antenna configuration 400 of the FIG. 4, the UE 110 may select between the first antenna panel 410, the second antenna panel 460 or the third antenna panel 470 for the transmission of the beam. This selection may be included in an operation that is related to beam management. Thus, in one example, the UE 110 may be triggered to select an antenna panel to use to perform beam sweeping. In another example, the UE 110 may be triggered to select an antenna panel to use to transmit a beam that includes scheduled payload data. However, these examples are merely provided for illustrative purposes, the exemplary embodiments may apply to any scenario in which the UE 110 is configured to select an antenna panel to use for the transmission of a beam.

In 510, the UE 110 determines whether a predetermined condition exists. The predetermined condition may indicate to the UE 110 that if a particular antenna panel is selected, the subsequently propagated signal would be unlikely to reach its intended reception point. Thus, the predetermined condition may relate to the presence of an obstruction in the line of sight between an antenna panel and the reception point or the presence of any connected accessories.

Determining whether the UE 110 has any connected accessories may be based on information generated by the connection of an accessory. For example, when an accessory has an active connection to the UE 110, the application processor of the UE 110 may perform various operations related to the connected accessory. Thus, the application processor may know the type of connected accessory. The type of connected accessory may indicate where interference may be generated relative to the UE 110. During operation, the accessory detection engine 245 may query the application processor for any information that provides an indication of the presence of a connected accessory. Alternatively, the application processor may be triggered to send a signal to the accessory detection engine 245 when an accessory is connected. However, this example is merely provided for illustrative purposes, the exemplary embodiments may apply to accessory detection that is performed in any appropriate manner.

Figure 6:
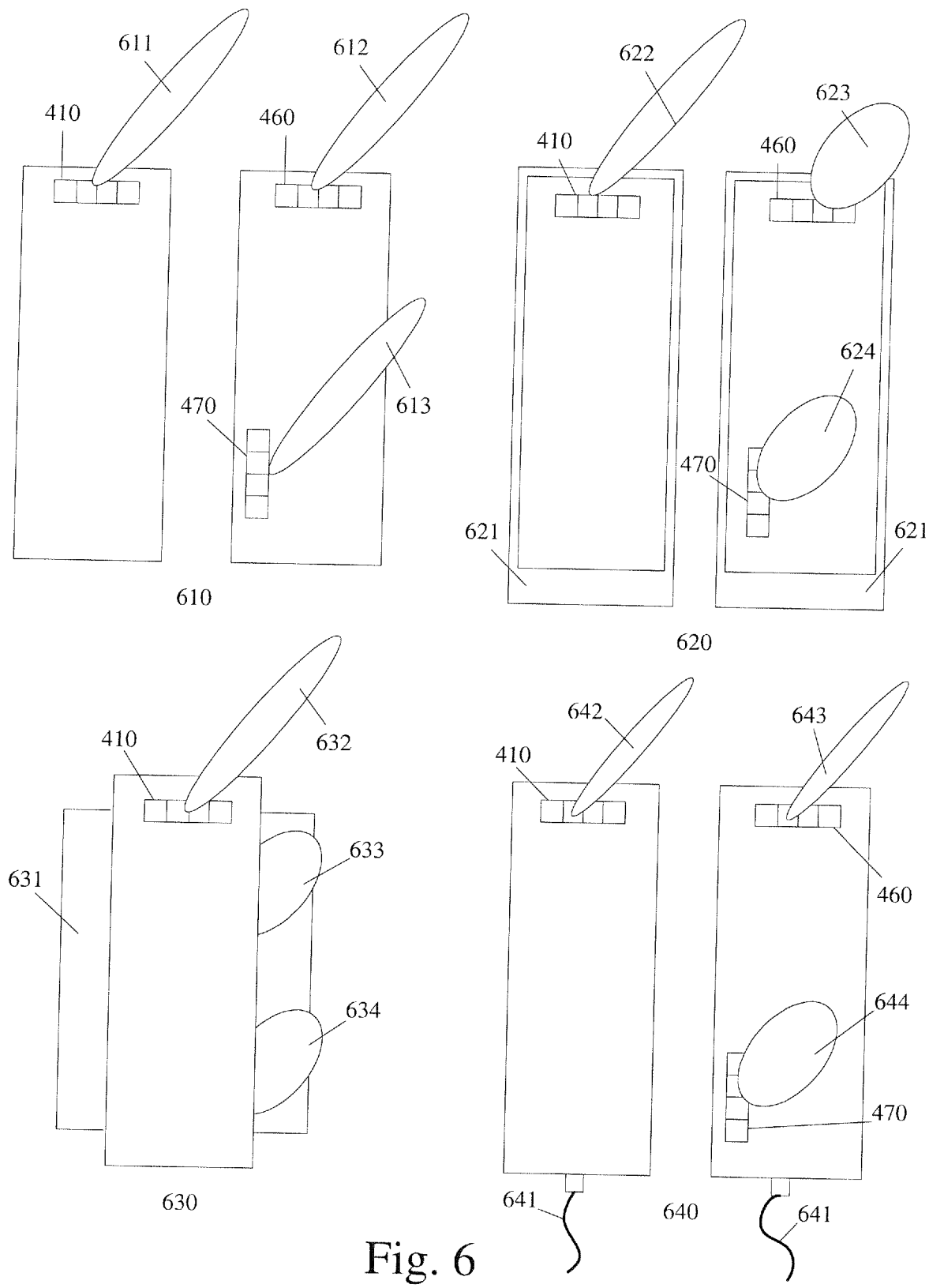
FIG. 6 shows an example of the effect interference generated by a connected accessory may have on the UE 110.

FIG. 6 shows an example of the effect interference generated by a connected accessory may have on the UE 110. FIG. 6 illustrates four different exemplary scenarios 610, 620, 630, 640, each depicting a UE 110 equipped with the exemplary antenna configuration 400 of the FIG. 4.

Exemplary scenario 610 illustrates the UE 110 with no connected accessory. With no accessory to generate interference, each antenna panel 410, 460, 470 may be capable of generating a beam 611-613 that is likely to reach its intended reception point.

Exemplary scenario 620 illustrates the UE 110 with a connected battery case 621. The battery case 621 is depicted as covering a majority of the back of the UE 110 and a portion of the front of the UE 110. Thus, the battery case 621 may obstruct the line of sight between antenna panels 460, 470 and a base station. The electrical components of the battery case 621 may also generate interference in the area around the antenna panels 460, 470. Accordingly, in this exemplary scenario 620, the antenna panel 410 is not obstructed nor subjected to any major interference from the battery case 621. As a result, the antenna panel 410 is capable of a beam 622 that is likely to reach its intended reception point. Antenna panels 460, 470 are obstructed and/or subjected to interference by the connected battery case 621. As a result, antenna panels 460, 470 would produce beams 623, 624 that are unlikely to reach their intended reception point. As described above, the application processor of the UE 110 may understand that an external battery is connected to the UE 110 and provide this information to the accessory detection engine 245.

Exemplary scenario 630, illustrates the UE 110 sitting on or adjacent to a wireless charging module 631. Similar to the exemplary scenario 620, the only antenna panel that is not obstructed nor subjected to interference by the wireless charging module 631 is the antenna panel 410. As a result, the antenna panel 410 is capable of a beam 632 that is likely to reach its intended reception point. Beams 633, 634 are propagated from the other antenna panels (e.g., 460, 470 of the exemplary antenna panel configuration 400, not pictured in the depiction of the exemplary scenario 630). Like the exemplary scenario 620, beams 633, 634 are obstructed and/or subjected to interference by the wireless charging module 631. As a result, beams 633, 634 are unlikely to reach their intended reception point.

Exemplary scenario 640 illustrates the UE 110 with a connected charging cable 641. Here, the connected charging cable 641 generates interference near the antenna panel 470. Accordingly, in this exemplary scenario 640, the antenna panels 410, 460 are not obstructed nor subjected to interference by the charging cable 641. As a result, beams 642, 643 that are both likely to reach their intended reception point. Antenna panel 470 is subjected to interference by the connected charging cable 641. As a result, beam 644 is unlikely to reach their intended reception point.

The exemplary embodiments are not limited to the connected accessories depicted in the FIG. 6. The exemplary embodiments may apply to any of a plurality of different accessories, including but not limited to, a charging cable (e.g., USB, lightning, etc.), a wireless charging module, a battery case, an adapter, headphones, a credit card reader, a near field communication (NFC) reader, a camera accessory, a gaming accessory, etc. It should be noted that the UE 110 may be an IoT device. An IoT device may refer to any non-standard computing device equipped for wireless communications. Thus, the exemplary embodiments are not limited to accessories associated with a mobile device. The exemplary embodiments may apply to detecting the presence of any type of connected component that may cause interference on a particular antenna panel of the UE 110.

Figure 7:
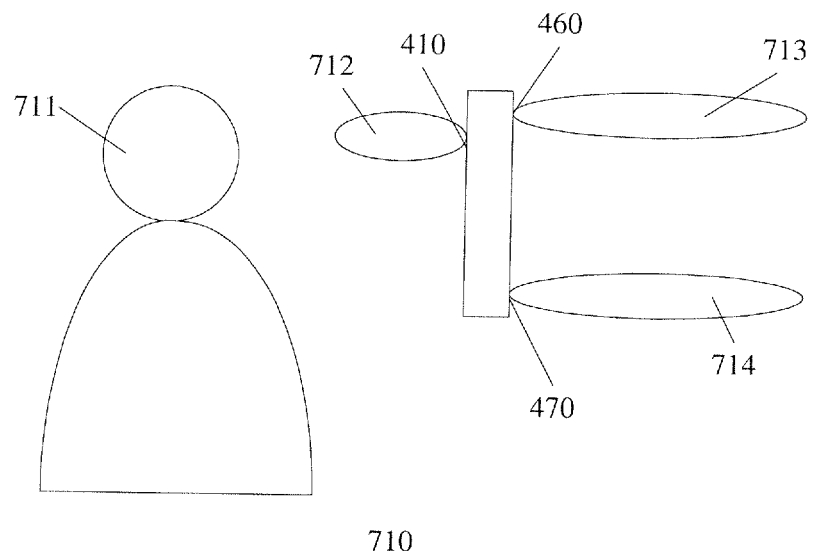
FIG. 7 shows an example of the effect an obstruction may have on the UE 110.
Figure 7:
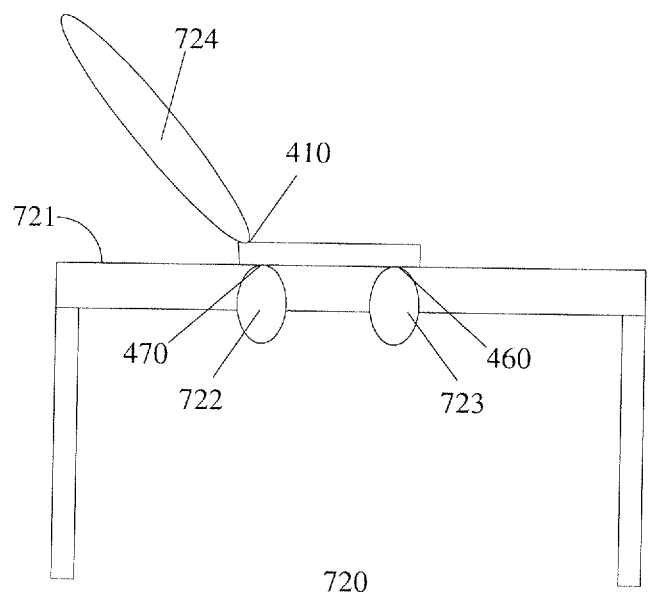

Returning to 510, determining if the predetermined condition exists may also include determining whether any objects are obstructing the line of sight between an antenna module of the UE 110 and the intended reception point. The UE 110 may determine the presence of an obstruction based on data collected by any of a plurality of components of the UE 110. For example, the UE 110 may receive data collected by either the front facing camera 407 or the rear facing camera 456. This data may indicate the presence of an obstruction and identify the type of obstruction (e.g., wall, building, body part corresponding to the user, etc.). The UE 110 may also receive data from other sensors such as but not limited to, infrared sensors, thermal sensors, proximity sensors, gyroscopes, radar, etc. However, these examples are merely provided for illustrative purposes, the exemplary embodiments may apply to a UE 110 that performs object detection in any appropriate manner FIG. 7 shows an example of the effect an obstruction may have on the UE 110. FIG. 7 illustrates two different exemplary scenarios 710, 720 each depicting a UE 110 equipped with the exemplary antenna configuration 400 of the FIG. 4.

Exemplary scenario 710 illustrates the user 711 operating the UE 110. Here, the antenna panel 410 is configured to generate the beam 712. However, the user 711 is located within the line of sight between the antenna panel 410 and the base station. During operation, the front facing camera of the UE 110 may collect data and the presence of the user 711 in the line of sight may be identified based on the collected data. In this exemplary scenario 710, if beam 712 were to propagate from the antenna panel 410 the beam 712 would be unlikely to successfully reach its intended reception point due to the presence of the user 711 in the line of sight. In addition, propagating toward the user's head may implicate various SAR requirements. Antenna panels 460 and 470 are unobstructed. During operation, the rear facing camera of the UE 110 may collect data and a clear line of sight may be identified. In the exemplary scenario 710, if the beams 713, 714 were to propagate from the their respective antenna panels 460, 470 these unobstructed beams 713, 714 would likely successfully reach their intended reception point.

Exemplary configuration 720 illustrates the UE 110 located on a table 721, with the back of the UE 110 making contact with the surface table 721. During operation, the gyroscope of the UE 110 may identify that the UE 110 is currently on a relatively flat surface and the back of the UE 110 is parallel with the flat surface. As a result, the UE 110 may determine that antenna panels 460 and 470 are obstructed by the flat surface of the table 721 and beams 722, 723 would be unlikely to successfully reach their intended reception point. Similarly, the UE 110 may determine that that antenna panel 410 is unobstructed because the antenna panel 410 is orientated away from the flat surface of the table 721. Thus, in the exemplary scenario 720, the beam 724 propagated from the antenna panel 410 would likely reach its intended reception point.

The exemplary embodiments are not limited to the exemplary scenario 710, 720 depicted in the FIG. 7. The exemplary embodiments may apply to object detection performed in any appropriate manner.

Returning to 510, if the predetermined condition is not identified, the method 500 may continue to 515. The lack of a predetermined condition may indicate to the UE 110 that the antenna panels have a clear line of sight and are not subjected to interference from any connected accessories. Thus, in 515, the UE 110 may select one of the antenna panels to use for the transmission of the beam based on a comparison of a metric corresponding to each antenna panel. For instance, the UE 110 may measure or receive an indication of the channel conditions at each antenna panel (e.g., 410, 460, 470 of the exemplary antenna panel configuration). The UE 110 may compare a metric associated with each antenna panel 410, 460, 470 (e.g., signal power, signal quality, etc.) and select the antenna panel to use for the transmission of the beam based on the comparison. Subsequently, the method 500 ends.

If the predetermined condition is identified in 510, the method 500 continues to 520. In 520, the UE 110 determines the antenna panels available for selection based on the identified predetermined condition. For example, consider the exemplary scenario 620 of FIG. 6. Here, the UE 110 identified the antenna panels 460, 470 as being obstructed and/or subjected to interference by the battery case 621. Thus, the UE 110 may determine that the only antenna panel that has a clear line of sight and is not subjected to interference from the battery case 621 is the antenna panel 410. Accordingly, the UE 110 determines that only antenna panel 410 is available for selection. To provide another example, consider the exemplary scenario 710 of the FIG. 7. Here, the UE 110 identified that the antenna panel 410 did not have a clear line of sight and that the antenna panels 460, 470 were unobstructed. Accordingly, the UE 110 determines that the antenna panels 460, 470 are available for selection.

In 525, the UE 110 selects the antenna panel to use for the transmission of the beam from the antenna panels determined to be available for selection in 520. As demonstrated above, the UE 110 may determine that only a single antenna panel is available for selection. Thus, in this scenario the UE 110 may select the only antenna panel available. If the UE 110 determines that more than one antenna panel is available for selection in 520, the UE 110 may select between those antenna panels based on any of a variety of different factors. For example, similar to 515 the UE 110 may compare a metric associated with each available antenna panel. In another example, the UE 110 may select between available antenna panels based on the viable propagation paths, the location of the reception point (e.g., the base station) or any other appropriate factor. Subsequently, the method 500 ends.

The UE 110 may experience conditions where each of the antenna panels are determined to have an obstruction in their respective lines of sight and/or are subjected to interference by a connected accessory. In this scenario, the exemplary embodiments incorporate object detection into beam steering. Beam steering relates to determining the direction in which to propagate a beam. As described above with regard to FIG. 1A and FIG. 1B, the direction a beam is propagated may be based on the phase and/or magnitude of the signal provided to each antenna element of the antenna panel. Thus, beam steering may be controlled by appropriately weighting the phase and/or magnitude of the signal provided to each antenna element for each beam. However, the exemplary embodiments may apply to a UE 110 that is able to control the direction of a beam in any manner.

Figure 8:
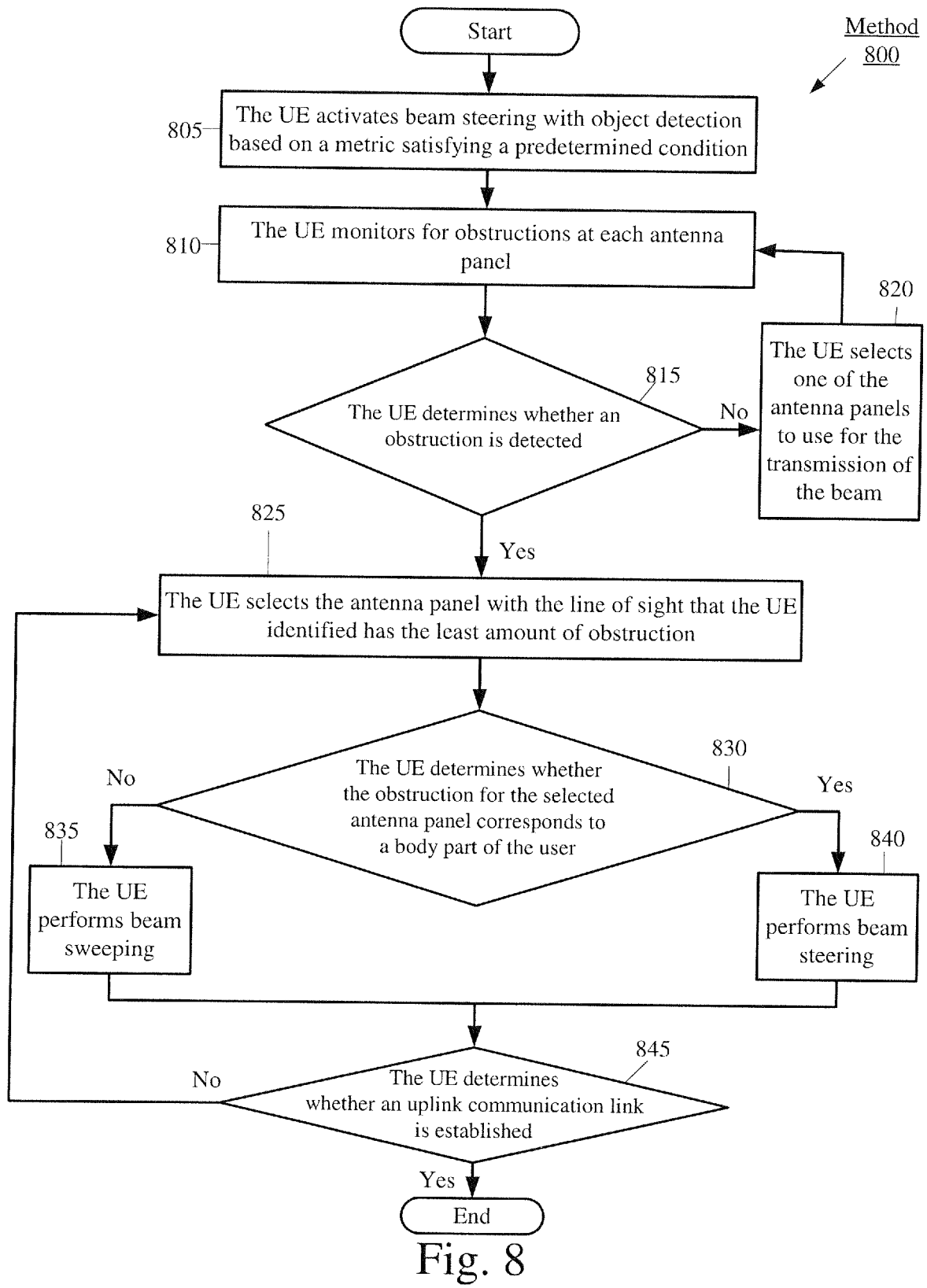
FIG. 8 shows a method for the UE to perform beam steering with object detection according to various exemplary embodiments.

FIG. 8 shows a method 800 for the UE 110 to perform beam steering with object detection according to various exemplary embodiments. The method 800 will be described with regard to the network arrangement 100 of FIG. 2, the UE 110 of FIG. 3 and the exemplary antenna panel configuration 400 of FIG. 4.

In 805, the UE 110 activates beam steering with object detection based on a metric satisfying a predetermined condition. This may indicate to the UE 110 the presence of an obstruction is likely. In one example, the metric may be reference signal receive power (RSRP). In another example, the metric may be signal-to-noise ratio (SNR). When these metrics are below a predetermined threshold the UE 110 may identify that signals received on the downlink are experiencing attenuation. Accordingly, there is likely an obstruction in the line of sight between the UE 110 and the base station. For latency and power consumption concerns, the UE 110 may activate beam steering with object detection when the UE 110 determines that the presence of an obstruction in the line of sight is likely. However, reference to a particular metric or a particular reason for activating beam steering with object detection is merely provided for illustrative reasons. The exemplary embodiments may activate beam steering with object detection for any appropriate reason.

In 810, the UE 110 monitors for obstructions at each antenna panel. As mentioned above with regard to 510 of the FIG. 5 object detection may be based on any of a plurality of different mechanisms. For example, the UE 110 may receive data collected by either the front facing camera 407 or the rear facing camera 456. This data may indicate the presence of an obstruction and identify the type of obstruction (e.g., wall, building, body part corresponding to the user, etc.). The UE 110 may also receive data from other sensors such as but not limited to, infrared sensors, thermal sensors, proximity sensors, gyroscopes, radar, etc. However, these examples are merely provided for illustrative purposes, the exemplary embodiments may apply to a UE 110 that performs object detection in any appropriate manner.

In 815, the UE 110 determines whether an obstruction is detected. In one example, the UE 110 may be configured to perform this determination periodically. For instance, when the UE 110 activates beam steering with object detection in 805, this may include establishing a schedule where the UE 110 makes this determination every (N) time duration during the execution of beam steering with object detection. In another example, the UE 110 may be configured to make this determination when a beam management operation is triggered. If no obstruction is detected the method continues to 820. If any obstruction is identified the method 800 may continue to 825.

In 820, the UE 110 has not identified any obstructions. This may indicate to the UE 110 that the antenna panels have a clear line of sight. Thus, in 820, the UE 110 may select one of the antenna panels to use for the transmission of a beam. For instance, similar to 515 of the FIG. 5, the UE 110 may measure or receive an indication of the channel conditions at each antenna panel (e.g., 410, 460, 470 of the exemplary antenna panel configuration). The UE 110 may compare a metric associated with each antenna panel 410, 460, 470 (e.g., signal power, signal quality, etc.) and select the antenna panel to use for the transmission of the beam based on the comparison. However, this is merely provided for illustrative purposes and the UE 110 may select any antenna panel for any appropriate reason. Subsequently, the method 800 returns to 810 where the UE 110 continues to monitor for obstructions at each antenna panel during the execution of beam steering with object detection.

In 825, the UE selects the antenna panel with the line of sight that the UR 110 identified has the least amount of obstruction. For instance, in one example, the UE 110 may determine that the line of sight corresponding to antenna panels 410, 460 show a partial obstruction and the line of sight corresponding to the antenna panel 470 did not show any obstruction. As a result, the UE 110 may select the antenna panel 470. In another example, if all three antenna panels 410, 460 and 470 were determined to include an obstruction, the UE 110 may determine the amount of obstruction corresponding to each antenna panel 410, 460, 470. Subsequently, the UE 110 may select the antenna panel that has the least amount of obstruction.

In 830, the UE 110 determines whether the obstruction for the selected antenna panel corresponds to a body part of the user (e.g., head, hand, etc.). This may indicate to the UE 110 whether the UE 110 is to subsequently perform beam sweeping or beam steering. If the obstruction does not correspond to a body part of the user, the method continues to 835 to perform beam sweeping and if the obstruction corresponds to a body part of the user the method continues to 840 to perform beam steering.

In 835, the UE 110 performs beam sweeping. As mentioned above, beam sweeping is an operation included in beam management. Beam sweeping may include transmitting a plurality of beams over a particular spatial area within a particular time duration. To change the direction of each beam transmitted during beam sweeping the UE 110 may appropriately weight the phase and/or magnitude of the signal provided to each antenna element. Each beam may include control information (e.g., SRS) that the base station may measure to determine which beam the UE 110 is to utilize for an uplink transmission link. Since the obstruction does not correspond to a body part of the user, the UE 110 does not need to consider specific absorption rate (SAR). Thus, the UE 110 may perform beam sweeping over any spatial area relative to the selected antenna element in an attempt to establish uplink synchronization with the base station.

Figure 9:
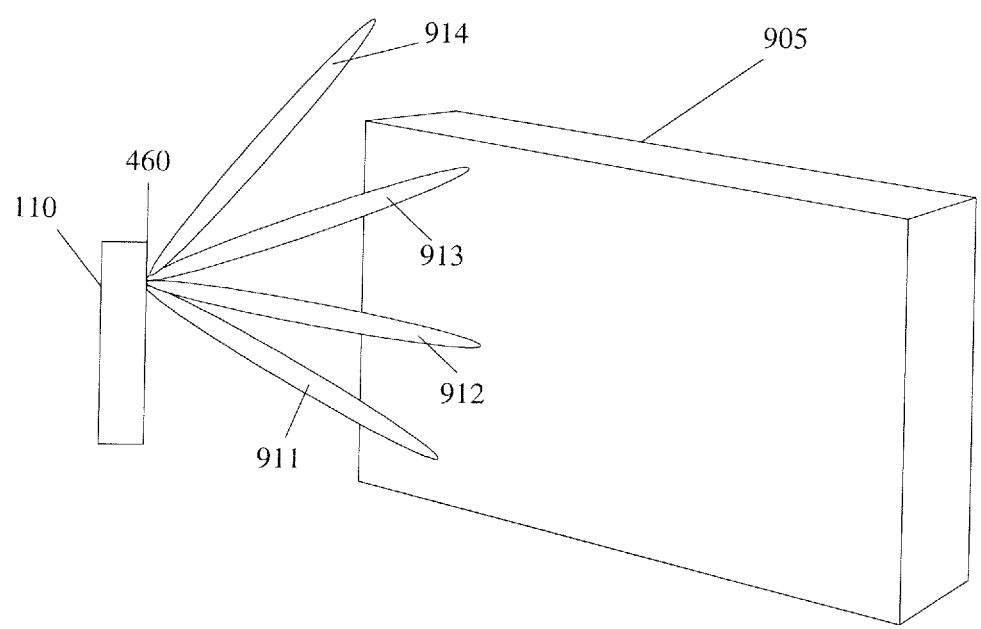
FIG. 9 shows an example of the UE 110 performing beam sweeping according to various exemplary embodiments.

FIG. 9 shows an example of the UE 110 performing beam sweeping according to various exemplary embodiments. Consider the following exemplary scenario, the antenna module 460 was selected as the antenna module with the least amount of obstruction. The obstruction was identified as the wall 905. Accordingly, the UE 110 performs beam sweeping and transmits a plurality of beams 911-914. Beam 914 has the clearest line of sight to the base station and thus, experiences the least amount of attenuation. Subsequently, the base station selects the beam 914 for the UE 110 to utilize for uplink communications. In one example, this selection may be provided to the UE 110 via a downlink beam from the base station. In another example, this selection may be provided to the UE 110 via a different network.

Returning to FIG. 8, in 840, the UE performs beam steering. Here, the obstruction was identified as corresponding to a body part of the user. Similar to beam sweeping, beam steering may include transmitting a plurality of beams over a particular spatial area within a particular time duration. However, since the obstruction does correspond to a body part of the user, the UE 110 may want to avoid transmitting a beam directly at the user. Accordingly, when the UE 110 configures the beams to be transmitted during beam sweeping, the UE 110 determines which directions (e.g., towards the user) to avoid. Subsequently, the UE 110 configures a plurality of beams to be transmitted to the base station that have a propagation path that is not directed towards the user. However, beam steering away from the user is merely exemplary, the UE 110 may perform beam steering to avoid any obstruction.

There may be scenarios where the UE 110 may be unable to completely avoid the user during beam steering. For example, in an obstruction scenario where all of the antenna panels are obstructed in some manner, there may be no beam steering patterns that completely avoid all the obstructions, including if one of the obstructions is the human body. In such a scenario, the UE 110 will have to select between various beam steering patterns that partially avoid the various obstructions. In such a scenario, those beam steering patterns that only partially avoid the body of the user may be deprioritized so that they are only selected when the other beam steering patterns that partially avoid other types of obstructions are unsuccessful. The factors that may cause such a scenario may include, but are not limited to, the hardware configuration of the UE 110 (e.g., the antenna panel placement), the position of the user's body parts relative to the UE 110, the number of base stations within range of the UE 110, the configuration of obstructions relative to the UE 110, the presence of a connected accessory, interference, radio link failure, network congestion or any combination thereof.

Figure 10:
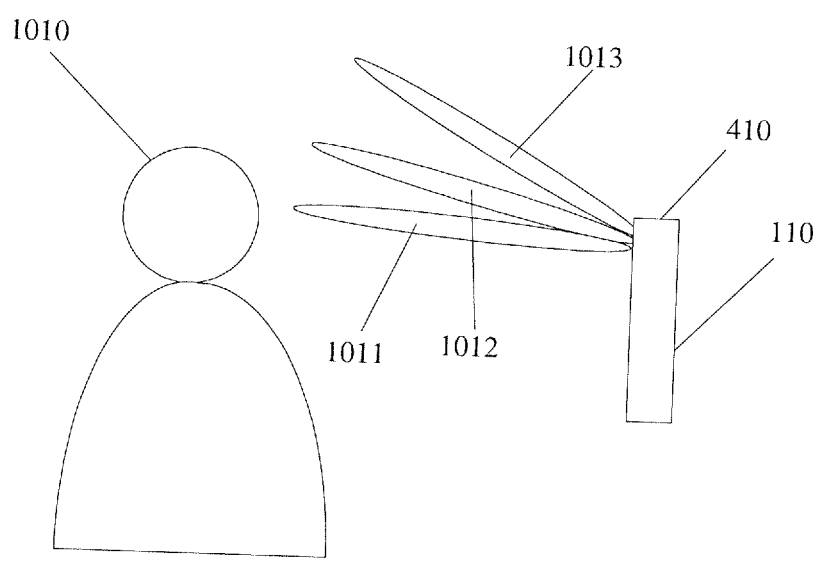
FIG. 10 shows an example of the UE 110 performing beam steering according to various exemplary embodiments.

FIG. 10 shows an example of the UE 110 performing beam steering according to various exemplary embodiments. Consider the following exemplary scenario, in which the antenna module 410 was selected as the antenna module with the least amount of obstruction. The obstruction was identified as the user 1010. Accordingly, the UE 110 performs beam steering and transmits a plurality of beams 1011-1013. The plurality of beams 1011-1013 are depicted as being steered away from the user with increasing elevation. During operation, the UE 110 may have identified that transmitting beams decreasing in elevation relative to the beam 1011 would have caused beams to be transmitted at the user 1010. Thus, when configuring the beams to be transmitted during beam steering, the UE 110 may not include any beams that the UE 110 determined would be directed at the user 1010.

Returning to FIG. 8, whether beam steering is performed in 835 or beam sweeping is performed in 840, the method 800 continues to 845.

In 845, the UE determines whether an uplink communication link is established. Whether beam sweeping or beam steering was performed, if none of the beams transmitted to the base station caused a communication link to be established with the base station, the method 800 returns to 825, where 830-845 are repeated for the next antenna panel. If a communication link is established with the base station based on one of the beams, the method 800 ends.

The exemplary embodiments describe various antenna selection methods for beamforming. These methods may be used in conjunction with other currently implemented antenna selection methods, future implementations of antenna selection methods or independently from other antenna selection methods for beamforming. The exemplary embodiments may apply to scenario where the UE 110 selects an antenna to use for the transmission of a beam.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a user equipment (UE) configured with a plurality of antenna panels, each antenna panel configured to beamform over a millimeter wave (mmWave) frequency band:
identifying a predetermined condition corresponding to a first antenna panel of the plurality of antenna panels, wherein the predetermined condition comprises detecting whether an accessory is connected to the UE and a type of accessory connected to the UE, wherein the type of accessory indicates where an interference is generated relative to the plurality of antenna panels of the UE;
selecting a second antenna panel of the plurality of antenna panels based on identifying the predetermined condition corresponding to the first antenna panel; and
transmitting a beam via the second antenna panel based on the selection.

2. The method of claim 1, wherein the predetermined condition further comprises detecting an obstruction.

3. The method of claim 2, wherein detecting the obstruction comprises receiving a signal from a sensor of the UE.

4. The method of claim 1, wherein detecting the accessory is connected to the UE is based on a signal received from an applications processor of the UE.

5. The method of claim 1, wherein, when each of the antenna panels has a corresponding predetermined condition, the method further comprising:
beamforming a beam from one of the antenna panels to mitigate the effects of the predetermined condition.

6. The method of claim 1, wherein, when the first antenna panel and the second antenna panel have a corresponding predetermined condition, the method further comprising:
selecting one of the first antenna panel and the second antenna for transmitting the beam based on a comparison of a metric for the first and second antenna panel.

7. A method, comprising:
at a user equipment (UE) configured with a plurality of antenna panels:
determining a predetermined condition based on a received signal, wherein the predetermined condition comprises detecting whether an accessory is connected to the UE and a type of accessory connected to the UE wherein the type of accessory indicates where an interference is generated relative to the plurality of antenna panels of the UE;
detecting, for each antenna panel, whether there is an obstruction between the antenna panel and an intended reception point for a signal to be transmitted by the UE; and
selecting one of the antenna panels to transmit the signal based on at least the detecting whether there is the obstruction.

8. The method of claim 7, wherein, when there is no obstruction for any of the antenna panels, the selecting the one of the antenna panels is further based on a comparison of a metric for each of the antenna panels.

9. The method of claim 7, wherein, when there is at least one of the antenna panels where there is no obstruction, the selecting the one of the antenna panels includes selecting the at least one of the antenna panels where there is no obstruction.

10. The method of claim 7, wherein, when all of the antenna panels have a corresponding obstruction, the selecting the one of the antenna panels is further based on a level of the corresponding obstruction.

11. The method of claim 7, further comprising:
when the one of the antenna panels includes the corresponding obstruction, determining whether the corresponding obstruction comprises a body part.

12. The method of claim 11, further comprising:
when the corresponding obstruction comprises the body part, performing a beam steering operation to transmit the signal.

13. The method of claim 11, further comprising:
when the corresponding obstruction does not comprise the body part, performing a beam sweeping operation to transmit the signal.

14. The method of claim 7, wherein the determining a predetermined condition based on the received signal, comprises determining one of a reference signal receive power (RSRP) or signal-to-noise ratio (SNR) for the received signal.

15. The method of claim 7, wherein the detecting whether there is an obstruction between the antenna panel and an intended reception point is performed at one of a predetermined time interval or when a beam management operation is triggered.

16. A user equipment (UE), comprising:
a plurality of antenna panels:
a sensor configured to detect, for each antenna panel, whether there is an obstruction between the antenna panel and an intended reception point for a signal to be transmitted by the UE; and
a processor configured to select one of the antenna panels to transmit the signal based on at least the whether the sensor detected a corresponding obstruction for each of the antenna panels and detecting whether there is an accessory connected to the UE and a type of accessory connected to the UE wherein the type of accessory indicates where an interference is generated relative to the plurality of antenna panels of the UE.

17. The UE of claim 16, wherein the sensor comprises one of a camera, an infrared sensor, a thermal sensor, a proximity sensor, a gyroscope, or a radar.

18. The UE of claim 16, wherein, when the one of the antenna panels includes the corresponding obstruction, the processor determines whether the corresponding obstruction comprises a body part.

19. The UE of claim 18, wherein, when the corresponding obstruction comprises the body part, a beam steering operation is performed to transmit the signal.

20. The UE of claim 18, wherein, when the corresponding obstruction does not comprise the body part, a beam sweeping operation is performed to transmit the signal.

* * * * *